United States Patent [19]
Fuchs

[11] 4,415,454
[45] Nov. 15, 1983

[54] NITRIFICATION TREATMENT OF WASTEWATER

[75] Inventor: Uwe Fuchs, Munich, Fed. Rep. of Germany

[73] Assignee: Linde Aktiengesellschaft, Wiesbaden, Fed. Rep. of Germany

[21] Appl. No.: 298,430

[22] Filed: Sep. 1, 1981

[30] Foreign Application Priority Data

Sep. 1, 1980 [DE] Fed. Rep. of Germany ....... 3032882

[51] Int. Cl.³ ............................................. C02F 3/08
[52] U.S. Cl. .................................... 210/616; 210/617; 210/630; 210/150; 210/903
[58] Field of Search ............... 210/617, 618, 603, 605, 210/150, 151, 626, 630, 903, 616

[56] References Cited

U.S. PATENT DOCUMENTS

| | | | |
|---|---|---|---|
| 2,071,591 | 2/1937 | Tholin | 210/616 |
| 3,293,174 | 12/1966 | Robjohns | 210/150 |
| 3,617,540 | 11/1971 | Bishop et al. | 210/903 |
| 3,764,523 | 10/1973 | Stankewich, Jr. | 210/903 |
| 4,009,099 | 2/1977 | Jeris | 210/903 |
| 4,055,490 | 10/1977 | Hasegawa et al. | 210/616 |
| 4,179,374 | 12/1979 | Savage et al. | 210/903 |
| 4,256,573 | 3/1981 | Shimodaira et al. | 210/630 |

FOREIGN PATENT DOCUMENTS

51-139169 12/1976 Japan .................................. 210/617

*Primary Examiner*—Benoît Castel
*Attorney, Agent, or Firm*—Millen & White

[57] ABSTRACT

In a two stage activated sludge plant, where in the first stage the major proportion of the organic pollutants is decomposed and in the second stage the decomposition of the residual organic pollutants is conducted in conjunction with nitrification, the nitrifying bacteria are fixed on a low-density, macroporous carrier, e.g., particulate, polyurethane, optionally with activated carbon as well. The second stage can be operated as a mixed activated sludge tank or a biological filter, and in either case, it is possible to avoid a post clarification stage.

10 Claims, 1 Drawing Figure

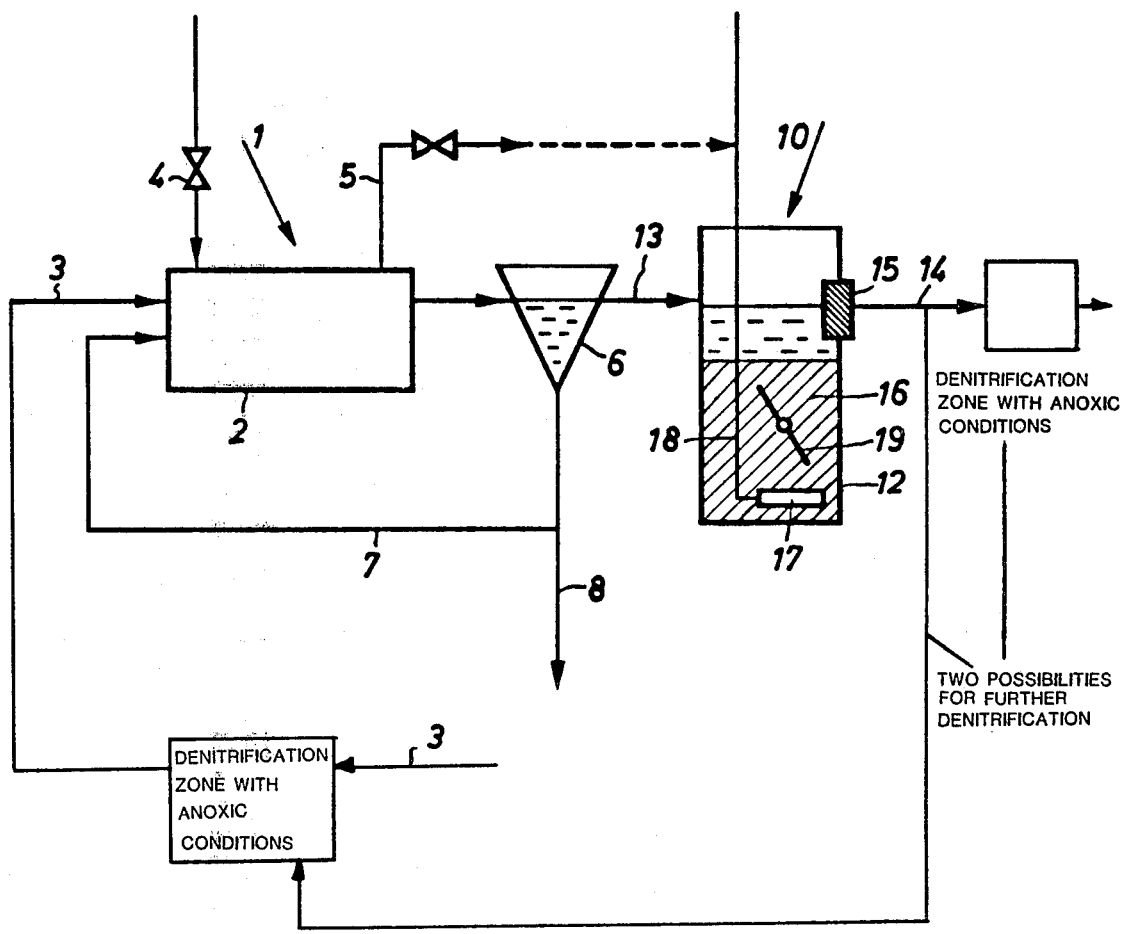

NITRIFICATION TREATMENT OF WASTEWATER

BACKGROUND OF THE INVENTION

This invention relates to wastewater treatment, and in particular to a two-stage biological oxidation treatment comprising: (a) decomposing the major quantity of organic pollutants in the first stage, and (b) decomposing residual amounts of pollutants in the second stage wherein nitrogen compounds are also oxidized in the presence of nitrifying bacteria.

In such a process, wastewater is conventionally initially mixed, in the first stage, with activated sludge with the simultaneous introduction of molecular oxygen in the form of air or a gas having a higher oxygen concentration. By virtue of the activity of the aerobic microorganisms contained in the activated sludge, the organic pollutants of the wastewater are decomposed or degraded, the specific mechanism being conversion, in part, into bacterial substance and, in part, into $CO_2$ and water, the overall effect in the first stage being extensive oxidation of the carbon compounds. After passing resultant wastewater-activated sludge mixture from the first stage into the second stage, residual degradation takes place in the latter stage, along with nitrification of the wastewater, assuming there is a sufficient oxygen supply, a sufficient water temperature, and a sufficiently low sludge load. In this nitrification process, ammonium nitrogen ($NH_4^+$-N) is practically completely oxidized to nitrate by the autotrophic bacteria growing in the sludge. To supply oxygen to the bacteria, it is also old to introduce into the aeration tank of the second stage as well, molecular oxygen in the form of air or a gas containing even a higher percent by volume of oxygen.

Since in such a method the primary amount of organic pollutants is degraded in the first stage, only a minor BOD load exists in the second stage, and for this reason, due to lack of nutrients and suspended solids, a sludge is formed in the second stage which settles very slowly and usually requires large post clarification tanks with sludge-removing devices, particularly in the case of the existence of floating sludge. However, even with the provision of large post clarification tanks, under conditions of a high hydraulic load and sludge drifting (which occurs in any treatment plant due to denitrification processes), a large proportion of the sludge particles passes over into the drainage canal from the post clarification tank, together with the slowly growing nitrifying bacteria. Aside from the fact that this spillover containing suspended matter impairs the overall quality of the resultant treated wastewater discharged from the plant, there occurs a significant disadvantage insofar as a part of the nitrifying bacteria is thus no longer available for the nitrification process.

SUMMARY OF THE INVENTION

An object of this invention is to provide a process generally of the type described above, as well as an apparatus for conducting said process wherein the nitrification capacity is increased and the quality of the treated wastewater is improved with respect to both the residual COD and BOD contents.

Another object is to provide a process capable of providing high denitrification capacities as the occasion requires.

Upon further study of the specification and appended claims, further objects and advantages of this invention will become apparent to those skilled in the art.

To attain these objects, the process of this invention comprises conducting the partially purified wastewater discharged from the first stage through a reactor in the second stage wherein the nitrifying bacteria are distributed on a carrier material made of a macroporous substance having a low specific gravity. Additionally, the process comprises a further optional treatment of the effluents from the reactor, e.g. denitrification.

In general, about 70 to 99% of the BOD is eliminated in the first stage. Consequently the feed to the second stage reactor generally contains about 5 to 1000, particularly 10 to 100 mg/l BOD. Conversely, substantially all the nitrogen in the form of ammonium ion ($NH_4^+$-N) is passed through the first stage into the second stage reactor, with the feed to the second stage reactor generally containing about 10 to 1000, particularly 20 to 200 mg/l of $NH_4^+$-N.

The use of a macroporous substance having a low specific gravity as the carrier or substrate material for the nitrifying bacteria provides a large active surface area for colonization, thereby permitting the bacteria colonies to be distributed uniformly. By being cultivated in the macropores of the substrate material, the nitrifying bacteria are thus forced to grow in a decentralized mode, whereby a substantially larger mass transfer area is obtained than in the case of the conventional flocculant activated sludge. Because the BOD load in the second stage is minor, there is no significant danger of an excessive sludge production due to autoxidation, irrespective of the high surface area exposed to microbiological growth. Since the nitrifying bacteria are also firmly fixed in the macropores of the carrier material, and the latter can be readily retained in the reactor, the danger that the nitrifying bacteria might drift off into the drainage canal is eliminated, thus permitting the secondary stage to be operated without a post clarification stage. Simultaneously, the floating sludge problem is also removed, which otherwise occurs in a post clarification stage due to denitrification problems. If nevertheless a post denification stage is used, this can be very small, because only excess sludge must be drawn off. Therefore, the retention time in such a post clarification stage is too short that denitrification problems with the existence of floating sludge rises.

Substances having a density of 10–200, preferably 20 to 80 kg/m$^3$ and with open macropores of a diameter of 0.1 to 5, preferably 1 to 3 mm are advantageously employed as the carrier material. (A density of 100 kg/m$^3$ is equivalent to a specific gravity of 0.10). Accordingly, a large surface area is available to the nitrifying bacteria as well as to the bacteria implicated in residual BOD degradation. Also, with such a pore size, clogging of the pores by contaminants is essentially avoided. By virtue of the low specific gravity of the carrier and assuming this carrier is in the form of relatively small discrete particles, it is moreover possible to circulate same fairly vigorously merely by means of the oxygen-containing gas (air and/or industrial oxygen) introduced into the reactor in the form of fine, e.g. 0.1 to 1.5 mm, medium-sized, e.g. 1.5 to 3 mm, or larger, e.g. 3 to 10 mm bubbles to maintain the nitrification process. The resultant turbulence can optionally be intensified by the use of mechanical means, e.g., a circulating pump or stirrer.

Inasmuch as the colonies of microorganisms growing in the pores of the carrier material are protected from turbulence and against abrasion, an advantage of this invention resides in the adaptability of the invention to the use of mechanical action without any significant loss of biomass.

Advantageously, organic polymers are used as the carrier material. Polyurethane foam or foam rubber, or similar substances with open macropores such as are obtained in the plastic-foam processing industry are highly suitable as carrier materials, with remnants and scrap pieces being both inexpensive and useful. For instance, as urethane foam particles ester or ether-linked particles can be used. Other usefull organic carrier materials are polyethylene or silicon-polymers. Furthermore, inorganic carrier materials such as inflated clay, pumice gravel or foamed metals can possibly be used, too.

In a preferred embodiment of the process, discrete carrier particles of a generally spherical or cubic shape with diameters from 0.5 to 50, especially 10 to 20 mm are employed in the reactor. This size of particle results in stable bacterial colonies and ensures an $O_2$ supply and mass transport to deep inside the pores of carrier particles. On the other hand, if so desired, anaerobic zones may be created inside the carrier material by limiting the concentration of the dissolved oxygen to preferably about 1 to 3 mg $O_2/l$ or by selecting the diameter of the individual particles to be within the upper range, e.g., preferably about 15 to 50 mm of the values indicated, whereby denitrification also takes place in the reactor in addition to the nitrification.

If the denitrification output so achieved does not suffice, i.e. does not meet specifically required denitrification levels, the reactor discharge from the second stage may be fed to an additional pre- and/or post-denitrification zone.

Advantageously the reactor is designed in the second stage as a thoroughly mixed activation tank or also as a biological filter. In particular, when it is designed as a biological filter—with floating bed, fluidized bed or solid bed reactors being applicable—the undesired suspended particles in the wastewater may be retained owing to the filtering action of the pores in the surface layers of the carrier material as well as the interstices between the individual carrier particles, whereas the nitrification oxidation and the decomposition of residual carbonaceous compounds occurs more internally of the porous carrier material. The filter may be oxygenated from bottom to top either cocurrently or countercurrently to the flow of the wastewater to be nitrified through the filter. Countercurrent flow is possible because the rising gas bubbles generate enough lift to maintain the biomass-laden low density carrier materials in flotation. To remove the retained suspended particles, a wash fluid, for instance pure water or water removed from the filter and cleansed, or also rinsing air, can be fed into the filter. For additional details of biological filters, attention is invited to the following reference, incorporated herein: U.S. Pat. No. 4,162,216.

The choice of the particular type of reactor depends on the pollutant load in the wastewater. For example, with highly charged wastewaters, e.g., BOD of at least 200 kg/m$^3$ and NH$_4^+$-N of at least 100 mg/l, the reactor more appropriately will be designed as a biological filter, whereas with less loaded wastewaters, a thoroughly mixed activation tank can be employed.

The proportion by volume of the carrier material with respect to the total reactor volume is advantageously 10 to 90%. For a tank with thoroughly mixed contents, this proportion for example may be advantageously 10 to 40%, whereas for a floating bed or a fluidized bed reactor it may be advantageously 40 to 70% and for a solid bed reactor, advantageously 70 to 90%.

The process of the invention is especially economical when activated carbon powder is deposited on the carrier material before the wastewater is made to pass through the reactor. With the energy consumption remaining constant, it is then possible under certain circumstances to double the oxygen input. For that purpose, for a low loaded waste water with a BOD content up to 100 mg/l a rate of 0.1–0.5 kg activated carbon per m$^3$ carrier material is sufficient. The activated carbon which serves as a catalytic agent for the oxygen transfer is desposited on top and in the pores of the carrier material mixed with the bacteria.

A plant for the implementation of the process comprises an activated sludge facility having two stages where the second stage reactor is separated from the first stage activation tank by an intermediate settling or clarification tank. In conformity with the invention, a carrier material for nitrifying bacteria is arranged on a low-density macroporous substance in the second stage reactor.

To retain the carrier material in the reactor, a separation device, for instance a plain sieve, is appropriately mounted in the discharge means of the second stage reactor. Moreover, if the second stage reactor is designed as a thoroughly mixed activation tank, slowly revolving paddle means may be mounted in the second stage reactor to achieve better mixing.

To provide for the feasibility of denitrifying the wastewater which is to be nitrified in the second stage reactor, a connection conduit at the second stage reactor discharge is appropriately hooked up to a denitrification zone before the first stage activation tank or after the second stage reactor. A denitrification zone before the first stage has the advantage that the incoming waste water has sufficient organic substratum which for the nitrite—and nitrate reduction is necessary as electron transmitter.

In such an apparatus according to the invention, a post clarification tank for the second stage can be eliminated, because (1) the nitrifying bacteria are firmly fixed in the macropores of the carrier, (2) the latter in turn can be retained with the aid of the separating device in the reactor of the second stage, and (3) the minor BOD load in the second stage does not involve excessive sludge production.

BRIEF DESCRIPTION OF THE DRAWING

The drawing is a schematic illustration of a preferred embodiment of an apparatus for conducting the process of the invention.

DETAILED DESCRIPTION OF THE DRAWING

In the FIGURE, the first stage of the wastewater treatment plant is denoted by 1 and the second stage by 10. The first stage 1 comprises an oxygenation tank 2 with a wastewater inlet conduit 3, a gas feed conduit 4 for the supply of oxygen or an oxygen-containing gas such as air, and an exhaust gas conduit 5. An intermediate settling tank 6 is connected downstream of the oxygenation tank 2 and comprises a sludge return line 7 to feed sludge into the oxygenation tank 2 and a sludge discharge line 8 to discharge excess sludge.

The second stage 10 comprises a reactor 12 with an inlet 13 connected to the intermediate settling tank 6 of the first stage 1, and an outlet 14 for treated wastewater to be conducted to a drainage canal. By means of a separating device 15, particulate carrier materials 16, and, concomitantly, nitrifying bacteria, are prevented from entering the discharge drain 14.

The carrier materials 16 for nitrifying bacteria, preferably made of scrap polyurethane foam or scrap foam rubber, are arranged in the reactor 12. The nitrifying bacteria are fed with oxygen introduced through gas sparger 17 (e.g., of a porous plate type) arranged at the bottom of the reactor and connected to a gas inlet 18. Air or oxygen-enriched air is introduced through gas inlet 18. Also, when the exhaust gas from the first stage contains above 21% by volume of $O_2$, it can be utilized for the oxygen enrichment of air by connecting conduits 5 and 18. Additionally, the circulation of the particulate carrier can be increased by a slowly rotating paddle mechanism 19.

In addition to the arrangement of the inlet 13 at the upper end of the reactor tank 12 of the second stage 10, as shown in the FIGURE, it may also be advantageous in certain cases to locate the inlet 13 at the lower end of the reactor 12 close to the bottom of the reactor. This modification permits, in addition to the turbulence created by the introduced gas, further agitation of the particulate carrier in the reactor by virtue of the water flowing from the bottom toward the top.

The following numerical data relate to two preferred embodiments of a second oxygenation stage operated according to this invention with foam material, and without a post clarification stage:

| Carrier | polyurethane foam cubes having an edge length of 1 to 1,5 cm, a density of 40 kg/cm³ and a pore size of 1 to 3 mm. | |
| --- | --- | --- |
| | throughly mixed activation tank | solid bed reactor |
| Carrier mass and distribution | 4000 kg   20 kg/m³ reactor volume. | 6400 kg   32 kg/m³ reactor volume. |
| Reactor volume | 200 m³ | 200 m³ |
| Wastewater feed rate | 67 m³/h | 109 m³/h |
| Aeration gas | 21-50% $O_2$ per Vol. | 21-50% $O_2$ per Vol. |
| Aeration period | 3 h | 1,8 h |
| $NH_4$ nitrogen load per unit volume | 0.8 kg N/m³ · d | 1,3 kg N/m³ · d |
| $BOD_5$ load per unit volume | 0.6 kg $BOD_5$/m³ · d | 1,0 kg $BOD_5$/m³ · d |
| $NH_4^+$—N in feed | 100 mg N/l | 100 mg N/l |
| $NH_4^+$—N in discharge | <5 mg N/l | <5 mg N/l |
| $BOD_5$ in feed | 75 mg/l | 75 mg/l |
| $BOD_5$ in discharge | <15 mg/l | <15 mg/l |
| COD in feed | 150 mg/l | 150 mg/l |
| COD in discharge | <50 mg/l | <50 mg/l |

The nitrifying bacteria used in the reactor of the second stage can possibly be nitrosomonas and nitrobacter.

For exemplified additional details of conventional normal two-stage process, attention is invited to the following reference, incorporated herein: U.S. Pat. No. 3,764,523.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the biological treatment of wastewaters in an activated sludge plant comprising two stages, where in the first stage the major proportion of the organic pollutants is decomposed and in the second stage the decomposition of the residual organic pollutants is conducted in conjunction with nitrification of nitrogen compounds in the presence of nitrogen bacteria, the improvement comprising conducting nitrification in a second stage reactor containing nitrifying bacteria fixed on a low-density, particulate, organic, macroporous carrier material, said low density being about 10–200 kg/m³, the pores of the carrier material being open macropores of about 0.1 to 5 mm in diameter, and the particles having a diameter of 0.5–50 mm, and wherein said second second stage is a thoroughly mixed activation tank with the nitrification being conducted in the second stage activation tank with a proportion by volume of the carrier material of 10 to 40% of the total volume of the second stage activation tank.

2. A process according to claim 1, wherein said carrier material is polyurethane.

3. A process according to claim 1, further comprising passing treated wastewater from the second stage reactor to a separate pre- or post-positioned denitrification zone.

4. A process according to claim 1, further comprising depositing activated carbon powder on the carrier material before the wastewater is passed through the second stage reactor.

5. In an apparatus for conducting the biological treatment of wastewaters comprising a two-stage activated sludge system having a first stage reactor and connected downstream therefrom an intermediate settling tank, a second stage reactor with discharge means comprising an outlet, and the second stage reactor connected downstream from the intermediate settling tank, the improvement comprising:
  a particulate, organic, macroporous, low-density carrier material arranged in the second stage reactor (12) and having nitrifying bacteria distributed thereon, said low-density being about 10–200 kg/m³, the pores of the carrier material being open macropores of 0.1 to 5 mm in diameter, and the particles having a diameter of 0.5–50 mm, and wherein said second stage reactor is an activation tank adapted for being thoroughly mixed with the proportion by volume of the carrier material therein being 10 to 40% of the total volume of the second stage activation tank volume, whereby nitrification capacity in the second stage reactor (12) is increased when the biological treatment process is conducted.

6. An apparatus according to claim 5, further comprising separating means (15) for retaining the carrier material (16) in said second stage reactor (12), said separating means (15) being mounted at a discharge means (14) of the second stage reactor (12).

7. An apparatus according to claim 5, further comprising a connecting conduit communicating the discharge means (14) of the second stage reactor (12) with a denitrification zone preceding the first stage reactor, or following the second stage reactor (12).

8. An apparatus according to claim 5, further comprising rotary paddle means (19) mounted in the second stage reactor (12) operative for enhancing mixing in the second stage reactor (12).

9. A biologically active material comprising a macroporous, particulate, organic carrier with the particles being of a diameter of 0.5–50 mm, a density of 10–200 kg/m³ and having open pores of 0.1 to 5 mm in diameter, and said carrier comprising a coat of carbon black and a coat of nitrifying bacteria on the walls of the pores of the carrier.

10. A carrier according to claim 9, wherein the carrier material is polyurethane foam.

* * * * *